US006527022B2

(12) United States Patent
Visel et al.

(10) Patent No.: US 6,527,022 B2
(45) Date of Patent: Mar. 4, 2003

(54) PNEUMATIC TIRE HAVING A TREAD CONTAINING A METAL OXIDE AEROGEL

(75) Inventors: Friedrich Visel, Bofferdange (LU); Uwe Ernst Frank, Marpingen (DE); Thierry Florent Edme Materne, Viville (BE); Rene Jean Zimmer, Howald (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 55 days.

(21) Appl. No.: 09/794,442

(22) Filed: Feb. 27, 2001

(65) Prior Publication Data

US 2001/0051681 A1 Dec. 13, 2001

Related U.S. Application Data

(60) Provisional application No. 60/188,357, filed on Mar. 10, 2000.

(51) Int. Cl.$^7$ .............................. C08K 3/36; B60C 1/00
(52) U.S. Cl. ........................ 152/209.1; 152/209.5; 524/261; 524/264; 524/430; 524/571; 524/575; 524/575.5
(58) Field of Search ................ 152/209.1, 208.5, 152/209.5; 524/405, 413, 430, 571, 575, 575.5, 261, 264

(56) References Cited

U.S. PATENT DOCUMENTS

| 2,727,876 A | 12/1955 | Iler ..................... 260/37 |
| 2,874,140 A | 2/1959 | Kloepfer ................ 260/41 |
| 3,977,993 A | 8/1976 | Lynch ................... 252/317 |
| 4,132,806 A | 1/1979 | Wason .................. 424/357 |
| 4,161,455 A | 7/1979 | Wason ................ 252/174.25 |
| 4,202,813 A | 5/1980 | Wason ................. 260/37 R |
| 4,356,214 A | 10/1982 | Soeda et al. ........... 427/233 |
| 4,422,880 A | 12/1983 | Wason .................. 106/288 |
| 4,619,908 A | 10/1986 | Cheng et al. ........... 502/214 |
| 4,717,708 A | 1/1988 | Cheng et al. ........... 502/233 |
| 4,954,327 A | 9/1990 | Blount ................. 423/338 |
| 5,227,239 A | 7/1993 | Upadbye et al. ......... 428/402 |
| 5,275,796 A | 1/1994 | Tillotson et al. ....... 423/338 |
| 5,381,149 A | 1/1995 | Dougherty et al. ......... 342/1 |
| 5,395,805 A | 3/1995 | Droege et al. ........... 401/72 |
| 5,556,892 A | 9/1996 | Pekala .................. 521/181 |
| 5,587,107 A | 12/1996 | Schwertfeger et al. ... 252/315.6 |
| 5,744,510 A | 4/1998 | Pekala .................. 521/181 |
| 5,807,494 A | 9/1998 | Boes et al. ............. 252/62 |
| 5,908,896 A | 6/1999 | Mayer et al. ........... 524/596 |
| 5,958,363 A | 9/1999 | Coronado .............. 423/592 |

FOREIGN PATENT DOCUMENTS

| GB | 0768049 | 12/1954 | |
| GB | 0797606 | 8/1955 | |
| GB | 0858742 | 7/1959 | |
| GB | 0921810 | 12/1961 | |
| GB | 1514283 | 6/1975 | ............. C08L/7/00 |
| GB | 2083011 | 9/1980 | ........... C01B/17/00 |
| WO | 9630304 | 10/1996 | |

OTHER PUBLICATIONS

Hermann, "High Performance Elastomer Compounds Through Reinforcement from Silica Aerogels" Kautschuk Gummi 49(4) pp. 289–292.*
Great Britain Search Report.
"How Silica Aerogels are Made" by E. O. Lawrence, Berkeley national Laboratory. Published Jul. 13, 1999.
"Aerogels——Airy Materials: Chemistry, Structures and Properties" by N. Hüsing and U. Schubert, *Angew. Chem. Int. Ed.*, 1998, pp. 22 through 45.

* cited by examiner

*Primary Examiner*—David J. Buttner
(74) *Attorney, Agent, or Firm*—Bruce J. Hendricks; John D. DeLong

(57) ABSTRACT

A pneumatic tire having a tread comprised of (a) a diene-based elastomer containing olefinic unsaturation and (b) from 1 to 150 phr of a metal oxide aerogel.

5 Claims, No Drawings

PNEUMATIC TIRE HAVING A TREAD CONTAINING A METAL OXIDE AEROGEL

This application claims the benefit of U.S. Provisional Application No. 60/188,357 filed Mar. 10, 2000.

BACKGROUND OF THE INVENTION

Silica have been used in treads of tires to improve traction. Unfortunately, one consequence of their use is an undesirable increase in the weight of the tire.

Aerogels are characterized by very low densities, large open pores, and a high inner surface area. For example, SiO2 aerogels have a high transparency similar to glass, a thermal conductivity lower than to polystyrene or polyurethane foam and very high specific surface areas similar to charcoal. As a result of these properties, aerogels have been used for heat insulation, optical applications, sensors, catalysts or catalyst carriers.

U.S. Pat. No. 4,356,214 discloses a method of coating the inner surface of a pneumatic tire with a sealing material containing polybutene, polyisobutylene, an aerogel and powder rubber.

SUMMARY OF THE INVENTION

The present invention relates to a pneumatic tire having a tread containing from 1 to 150 phr of a metal oxide aerogel.

DETAILED DESCRIPTION OF THE INVENTION

There is disclosed a pneumatic tire having a tread comprised of (a) a diene-based elastomer containing olefinic unsaturation and (b) 1 to 150 phr of a metal oxide aerogel.

The pneumatic tire of the present invention has a pair of bead cores which each comprise a plurality of metallic filaments. The tire may have one or more carcass plies that extend between its bead cores. A belt structure having at least two (2) belt plies is disposed radically outwardly of the main portion of the carcass ply or plies and a ground engaging tread portion is disposed radically outwardly of the belt structure. The term "belt structures" as used herein means at least two (2) layers of plies of parallel cords, woven or unwoven, underlying the tread, unanchored to the bead, and having both left and right cord angles in the range from 17 to 27 degrees with respect to the equatorial plane (EP) of the tire. Equatorial plane (EP) means the plane perpendicular to the tire's axis of rotation and passing through the center of the tire's tread. The tread may consist of a tread cap and tread base. Sidewall portions extend radically inwardly from the tread portion to the bead portions. On the axially inner side of the carcass ply, an innerliner may be used. The innerliner consists of a layer or layers of elastomer that form the inside surface of the tire and contains the inflating fluid, such as air, within its tire. Additional barriers, reinforcement strips or gum strips in the sidewall, such as an apex or chafer, may be part of the pneumatic tire.

In accordance with the present invention, the tread of the pneumatic tire contains a metal oxide aerogel. More specifically, the whole tread may contain the aerogel or the tread may have two components, namely, a tread cap and tread base. In the instance of a tread cap and tread base, either component or both components may contain the metal oxide aerogel.

The rubber component of the tire of the present invention contains an elastomer containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM) and, in particular, ethylene/propylene/dicyclopentadiene terpolymers. Additional examples of rubber which may be used include silicon-coupled and tin-coupled star-branched polymers. The preferred rubber or elastomers are polybutadiene and SBR.

In one aspect, the rubber is preferably of at least two of diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 weight percent bound styrene or, for some applications, an E-SBR having a medium to relatively high bound styrene content; namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile terpolymer rubbers containing about 2 to about 40 weight percent bound acrylonitrile in the terpolymer are also contemplated as diene-based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene (synthetic) and cis 1,4-polyisoprene natural rubber are well known to those having skill in the rubber art.

The term "phr" as used herein, and according to conventional practice, refers to "parts by weight of a respective material per 100 parts by weight of rubber, or elastomer".

The metal oxide aerogels for use in the present invention contain a metal selected from the group consisting of germanium, tantalum, zirconium, boron, titanium, aluminum silicon and mixtures thereof The preferred metals are silicon and aluminum. When one desires to prepare a metal oxide aerogel of silicon, one may use the silicon alkoxide precursors. The most common of these are tetraethoxysilane (TEOS, $Si(OCH_2CH3)_4$)and tetramethoxysilane (TMOS, $Si(OCH_3)_4$), tetrapropoxysilane and tetrabutoxysilane. However, many other metal alkoxides, containing various other metals, can be used to impart different properties to the aerogel. Representative examples of such metal alkoxides include the alkoxides of germanium, tantalum, zirconium, boron, titanium, aluminum and mixtures thereof Specific examples of these metal alkoxides include the $C_1$–$C_5$ alkoxides of germanium, $C_1$–$C_5$ alkoxides of tantalum, $C_1$–$C_5$ alkoxides of zirconium, $C_1$–$C_5$ alkoxides of boron, $C_1$–$C_5$ alkoxides of titanium, $C_1$–$C_5$ alkoxides of aluminum and mixtures thereof.

The aerogel for use in the present invention contains from 0.1 percent to 30 percent by mole of a metal selected from the group consisting of germanium, tantalum, zirconium, boron, titanium, aluminum, silicon and mixtures thereof Preferably, the level of metal ranges from 2 to 15 percent by mole.

The aerogel may contain at least two (2) metals of the above described metals. Preferably, one of the metals is silicon, titanium or zirconium. Another preferred metal is aluminum. One aerogel for use in the present invention contains from 0.1 to 1 moles of silicon oxide and from 1 to 0.1 moles of an oxide selected from the group of oxides of germanium, tantalum, zirconium, boron, titanium, aluminum and mixtures thereof Preferably, the mole ratio is 1:1.

The formation of aerogels, in general, involves two (2) major steps, the formation of a wet gel, and the drying of the wet gel to form an aerogel. The formation of the wet gel is generally conducted in an alcohol, such as ethanol. Such a reaction is preferably in the presence of a catalyst. Acid catalysts can be any protic acid, such as HCl. Basic catalysis usually use ammonia or ammonia buffered with ammonium fluoride.

After the sol reaches the gel point, it is typically aged. After aging, all water still contained within its pores must be removed prior to drying. This is generally accomplished by soaking the gel in pure alcohol several times until all the water is removed. Any water left in the gel may not be removed by supercritical drying and may lead to opaque, white and very dense aerogel.

The liquid within the gel is removed during supercritical drying. The process may be performed by venting the ethanol above its critical point (high temperature) or by prior solvent exchange with $CO_2$ followed by supercritical venting (lower temperatures). The process is typically performed in an autoclave which has been filled with ethanol. The system is pressurized to at least 750 to 850 psi (10.16–12.1 grams per cm2) with $CO_2$ and cooled to 5 to 10° C. Liquid $CO_2$ is then flushed through the vessel until all its ethanol has been removed from the vessel and from the gel. When the gels are ethanol-free, the vessel is heated to a temperature above the critical temperature of $CO_2$ (31° C.). As the vessel is heated, the pressure of the system rises and should be controlled to maintain a pressure slightly above the critical pressure of $CO_2$. This drying stage may be conducted from twelve (12) hours to six (6) days.

In addition to the above, a number of other known and published methods may be used to prepare the metal oxide aerogels for use in the present invention. For example, U.S. Pat. No. 3,977,933 discloses metal oxide aerogels derived from metal oxide hydrogels of such metals including silicon titanium, boron, vanadium chromium, tungsten, molybdenum, aluminum, iron and mixtures thereof U.S. Pat. Nos. 5,395,805 and 5,9358,363 disclose a method for making menolithic metal oxide aerogels derived from alkoxides of tantalum, titanium, zirconium, molybdenum, niobium, tungsten, hafinium, vanodium, chromium, boron, aluminum, silicon, germanium, tin, lead and mixtures thereof U.S. Pat. Nos. 4,619,908 and 4,717,708 disclose the preparation of aerogel compositions such as $TiO_2/SiO_2$, $Al_2O_3/SiO_2$, ZnO/$SiO_2$ and $ZrO_2/SiO_2$. U.S. Pat. No. 5,275,796 discloses a method of producing metal oxides having densities less than 0.02 g/cc. U.S. Pat. No. 5,227,239 discloses a method for making hollow aerogel microsphere of 800 to 1200 mu in diameter and 100 to 300 mu in wall thickness from metal alkoxide of germanium, tantalum, zirconium, boron, titanium, aluminum and silicon.

Additional methods of preparing the aerogels include precipitating silicon in a solution followed by the above described drying process. The aerogels may also be prepared by hydrolyzing organosilicon compounds such as of the formula $Si(OR)_4$, $R_1$—$Si(OR')_3$, $R_2$—$Si(OR')_2$ and $R_3$—$Si(OR')$.

Additional levels of aluminum in the aerogel may be obtained by adding aluminum compounds such as aluminum alkyl, for example $Al(C_2H_5)_3$ and/or aluminum alcoholates $Al(OR)_3$ when R is methyl, ethyl and the like, to the hydrolysis process together with silicon alkoxide i.e. TEOS.

One particular type of aerogel that may be used is $SiO_2$ aerogels containing carbon particles. Representative examples of such aerogels, including a method of their preparation, are described in U.S. Pat. No. 5,587,107, which is incorporated by reference in its entirety. These aerogels may be obtained by heating unmodified or organically modified $SiO_2$ aerogels. One method of preparation includes heating organically modified $SiO_2$ aerogels in the presence of at least one pyrolyzable hydrocarbon gas and/or at least one inert gas to 600° to 1300° C. Representative examples or organically modified $SiO_2$ aerogels contain organic radicals R directly bonded to silicon atoms or bonded via oxygen atoms. Examples of suitable organic radicals R are alkyl, alkenyl, alkenyl and aryl.

In accordance with another embodiment, the organically modified $SiO_2$ aerogels may be used as is prior to any heat treatment in the presence of the pyrolyzable hydrocarbon gas and/or inert gas. Another method of preparation includes heating organically unmodified $SiO_2$ aerogels in the presence of at least one pyrolyzable hydrocarbon gas and in the presence or absence of inert gases to 60° C. to 1300° C. The $SiO_2$ aerogels are generally kept in an atmosphere containing pyrolyzable hydrocarbon gases for a period of from 1 to 10, preferably from 3 to 5, hours at from 600° to 1300° C. preferably from 700° to 1200° C., particularly preferable from 900° to 1000° C. A gentle steam of the pyroyzable hydrocarbon gas is preferably established. For example, a stream of from 10 to 500 $cm^3$/min is set in the case of from 10 to 100 $cm^3$ of aerogel. Representative pyrolyzable hydrocarbon gases include methane, propane or acetylene. A mixture, such as natural gas, may also be used. The pyrolyzable gas can, if required, be diluted with an inert gas, in particular nitrogen or argon.

According to the process described above, for example, $SiO_2$ aerogels containing carbon particles and having a carbon content of from 1 to 43 percent by weight are obtained starting from organically unmodified $SiO_2$, in bead form (particle diameter from 2 to 6 mm) or in powder form (particle diameter from 0.1 to 0.3 mm) after thermal treatment for from 1 to 10 hours. Such $SiO_2$ aerogels containing carbon particles had a specific absorbance (in $m^2$/kg) of 330 to 2.5 $\mu$m, 290 at 5.0 $\mu$m and 280 at 6 $\mu$m, for example, with a carbon content of 16 percent by weight.

Depending on the desired properties of the tread, the metal oxide aerogels may be used in a variety of levels. For example, the metal oxide aerogel may be present in an amount ranging from 0.1 to 150 phr with a range of from 0.5 to 40 phr being preferred. The most preferred level ranges from 5 to 15 phr.

Compared to conventional fillers, aerogels have some advantages. One advantage is a lower density, which will lead to a lower overall tire weight when used at the same level. It is contemplated that lower levels of aerogels may be used compared to conventional levels of carbon black and precipitated silicas. Lower tire weight contributes to reduced rolling resistance (lower fuel consumption). Aerogels have higher surface areas than conventional fillers which will improve the abrasion resistance of a rubber which contains such aerogels.

In addition to the metal oxide aerogel, the rubber composition may contain conventional rubber fillers to contribute a reasonably high modulus and high resistance to tear. The filler may be added in amounts ranging from 10 to 250 phr. When the filler is silica, the silica is generally present in an amount ranging from 10 to 150 phr. Preferably, the silica is present in an amount ranging from 15 to 70 phr. When the filler is carbon black, the amount of carbon black will vary from 0 to 80 phr. Preferably, the amount of carbon black will range from 0 to 40 phr.

The commonly employed particulate precipitated silica used in rubber compounding applications can be used. These precipitated silicas include, for example, those obtained by the acidification of a soluble silicate; e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi—Sil trademark with designations 210, 243, etc; silicas available from Rhone-Poulenc, with, for example, designations of Z1165MP and Z165GR and silicas available from Degussa AG with, for example, designations VN2 and VN3, etc.

The processing of the rubber containing the metal oxide aerogel may be conducted in the presence of a sulfur containing organosilicon compound. Examples of suitable sulfur containing organosilicon compounds are of the formula:

in which Z is selected from the group consisting of

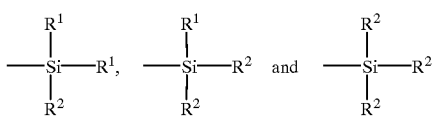

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis (triethoxysilylpropyl) tetrasulfide, 3,3'-bis (triethoxysilylpropyl) octasulfide, 3,3'-bis (trimethoxysilylpropyl) tetrasulfide, 2,2'-bis (triethoxysilylethyl) tetrasulfide, 3,3'-bis (trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3 '-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"- ethylhexoxysilylpropyl) trisulfide, 3,3'-bis (triisooctoxysilylpropyl) tetrasulfide, 3,3'-bis(tri-t-butoxysilyipropyl) disulfide, 2,2'-bis(methoxy diethoxy silyl ethyl) tetrasulfide, 2,2'-bis(tripropoxysilylethyl) pentasulfide, 3,3'-bis(tricyclohexoxysilylpropyl) tetrasulfide, 3,3'-bis(tricyclopentoxysilyipropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilyipropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis (triethoxysilylpropyl) disulfide and 3,3'-bis (triethoxysilylpropyl) tetrasulfide. Therefore, as to Formula I, preferably Z is

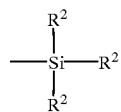

where $R^2$ is an alkoxy of 2 to 4 carbon atoms, with 2 carbon atoms being particularly preferred; Alk is a divalent hydrocarbon of 2 to 4 carbon atoms, with 3 carbon atoms being particularly preferred; and n being an integer of from 2 to 4 being particularly preferred.

The amount of the sulfur containing organosilicon compound of Formula I in a rubber composition may vary. Generally speaking, the amount of the organosilicon compound of formula I will range from 1 to 20 phr. Preferably, the amount will range from 1 to 10 phr.

The rubber compositions of the present invention may contain a methylene donor and a methylene acceptor. The term "methylene donor" is intended to mean a compound capable of reacting with a methylene acceptor (such as resorcinol or its equivalent containing a present hydroxyl group) and gene rate the resin in-situ. Examples of methylene donors which are suitable for use in the present invention include hexamethylenetetramine, hexaethoxymethylmelamine, hexamethoxymethyl melamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

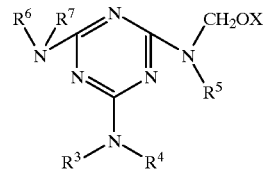

wherein X is an alkyl having from 1 to 8 carbon atoms, $R^3$, $R^4$, $R^5$, $R^6$ and $R^7$ are individually selected from the group consisting of hydrogen, an alkyl having from 1 to 8 carbon atoms and the group —$CH_2OX$. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N',N"-tributyl-N,N', N"-trimethylol-melamine. The N-methylol derivatives of melamine are prepared by known methods.

The amount of methylene donor and methylene acceptor that is present in the rubber stock may vary. Typically, the amount of methylene donor and methylene acceptor that are present will range from about 0.1 phr to 10.0 phr. Preferably, the amount of methylene donor and methylene acceptor ranges from about 2.0 phr to 5.0 phr for each.

The weight ratio of methylene donor to the methylene acceptor may vary. Generally speaking, the weight ratio will range from about 1:10 to about 10:1. Preferably, the weight ratio ranges from about 1:3 to 3:1.

It is readily understood by those having skill in the art that the rubber composition would be compounded by methods generally known in the rubber compounding art, such as mixing the various sulfur-vulcanizable constituent rubbers with various commonly used additive materials. As known to those skilled in the art, depending on the intended use of the sulfur vulcanizable and sulfur-vulcanized material (rubbers), the additives mentioned below are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of processing oils comprise about 1 to about 50 phr. Such processing aids can include, for example, aromatic, naphthenic and/or paraffinic processing oils. Typical amounts of antioxidants comprise about 1 to about 5 phr. Representative antioxidants may be, for example, diphenyl-p-phenylenediamine and others, such as, for example, those disclosed in the Vanderbilt Rubber Handbook (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of microcrystalline and paraffinic waxes comprise about 1 to about 10 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages; namely, at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and polymeric resin are mixed in one or more non-productive mix stages. The terms "non-productive" and "productive" mix stages are well known to those having skill in the rubber mixing art.

The aerogel may also be incorporated into the rubber by the use of solvents. For example, one may incorporate the metal oxide aerogel in the emulsion or solution before or during the polymerization reaction to form the elastomer. In an alternative embodiment, one may incorporate the metal oxide aerogel in the latex or rubber cement (in solution) followed by recovery and drying of the polymer for subsequent use in the tread of a tire.

The sulfur vulcanizable rubber composition containing the aerogel, and vulcanizable rubber as well as the optional sulfur-containing organosilicon compound, may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

In further accordance with the invention, the process comprises the additional step of vulcanizing the prepared rubber composition at a temperature in a range of about 140° C. to about 190° C.

In additional accordance with the invention, the process comprises the additional steps of preparing an assembly of a tire or sulfur-vulcanizable rubber with a tread comprised of the said rubber composition prepared according to the process of this invention and vulcanizing the assembly at a temperature in a range of about 140° C. to about 190° C.

Accordingly, the invention also thereby contemplates a vulcanized tire prepared by such process.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

While certain representative embodiments and details have been shown for the purpose of illustrating the invention, it will be apparent to those skilled in this art that various changes and modifications may be made therein without departing from the spirit or scope of the invention.

What is claimed is:

1. (Amended) A pneumatic tire having a tread comprised of (a) a diene-based elastomer containing olefinic unsaturation and (b) from 1 to 150 phr of metal oxide aerogel wherein said metal oxide aerogel is a $SiO_2$ aerogel containing carbon particles.

2. (Amended) The pneumatic tire according to claim 1 wherein the $SiO_2$ aerogel has a carbon content of from 1 to 43 percent by weight.

3. (Amended) The pneumatic tire according to claim 1 wherein said $SiO_2$ aerogel is an organically modified $SiO_2$ aerogel.

4. (Amended) The pneumatic tire according to claim 1 wherein said $SiO_2$ aerogel is obtained by heating organically unmodified $SiO_2$ aerogels in the presence of at least one pyrolyzable hydrocarbon gas and in the presence or absence of inert gases to 600° to 1300° C.

5. The pneumatic tire of claim 3 wherein said organically modified $SiO_2$ aerogels contain organic radicals selected from the group consisting of alkyls, alkenyls, alkenyl and aryl, which are directly bonded to silicon atoms or bonded via oxygen atoms.

* * * * *